(12) United States Patent
Felten et al.

(10) Patent No.: US 9,174,321 B2
(45) Date of Patent: *Nov. 3, 2015

(54) LENS BLOCKING AND DEBLOCKING METHOD AND RELATED DEVICE

(75) Inventors: Yohann Felten, Charenton-le-Pont (FR); Yannick Gordiet, Charenton-le-Pont (FR); Matthieu Le Gall, Charenton-le-Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 1146 days.

This patent is subject to a terminal disclaimer.

(21) Appl. No.: 12/599,265

(22) PCT Filed: May 7, 2008

(86) PCT No.: PCT/EP2008/055665
§ 371 (c)(1),
(2), (4) Date: Oct. 21, 2010

(87) PCT Pub. No.: WO2008/135600
PCT Pub. Date: Nov. 13, 2008

(65) Prior Publication Data
US 2011/0031637 A1    Feb. 10, 2011

(30) Foreign Application Priority Data

May 7, 2007  (EP) .................................. 07290572

(51) Int. Cl.
*B29D 11/00* (2006.01)
*B24B 13/005* (2006.01)

(52) U.S. Cl.
CPC ...... *B24B 13/0057* (2013.01); *B29D 11/00942* (2013.01)

(58) Field of Classification Search
USPC ............ 264/1.7, 2.7, 162; 451/384, 385, 390, 451/460
IPC ........................ B24D 13/0057; B29D 11/00942
See application file for complete search history.

(56) References Cited

U.S. PATENT DOCUMENTS

| 3,468,366 A | 9/1969 | Suddarth |
| 5,096,969 A | 3/1992 | Payne et al. |
| 5,763,075 A | 6/1998 | Benjamin et al. |

(Continued)

FOREIGN PATENT DOCUMENTS

| WO | WO 97/10924 | 3/1997 |
| WO | WO 98/41359 | 9/1998 |

(Continued)

*Primary Examiner* — Mathieu Vargot
(74) *Attorney, Agent, or Firm* — Cozen O'Connor

(57) ABSTRACT

A method of deblocking a lens component (1) fixed on a thermoplastic block (2) of an ophthalmic lens block comprising the steps of: a) applying a pushing strain on the surface (14) of the lens component fixed on the thermoplastic block; b) providing a warm gas flow at the interface between the lens component (1) and the thermoplastic block; and maintaining the pushing strain during the step of providing the warm gas flow at the interface between the lens component and the thermoplastic block, wherein the stress applied to obtain the pushing strain of step a) is greater or equal to 0.1 MPa and/or less or equal to 1 Mpa, and wherein the temperature of the warm gas flow of step b) is greater or equal to 30° and/or less or equal to 70° C.

13 Claims, 1 Drawing Sheet

(56) References Cited

U.S. PATENT DOCUMENTS 6,036,313 A 3/2000 Benjamin et al.
8,733,930 B2 * 5/2014 Felten et al. ............. 351/159.73

FOREIGN PATENT DOCUMENTS

| WO | WO 99/11430 | | 3/1999 |
| WO | WO 03/018253 | * | 3/2003 |

* cited by examiner

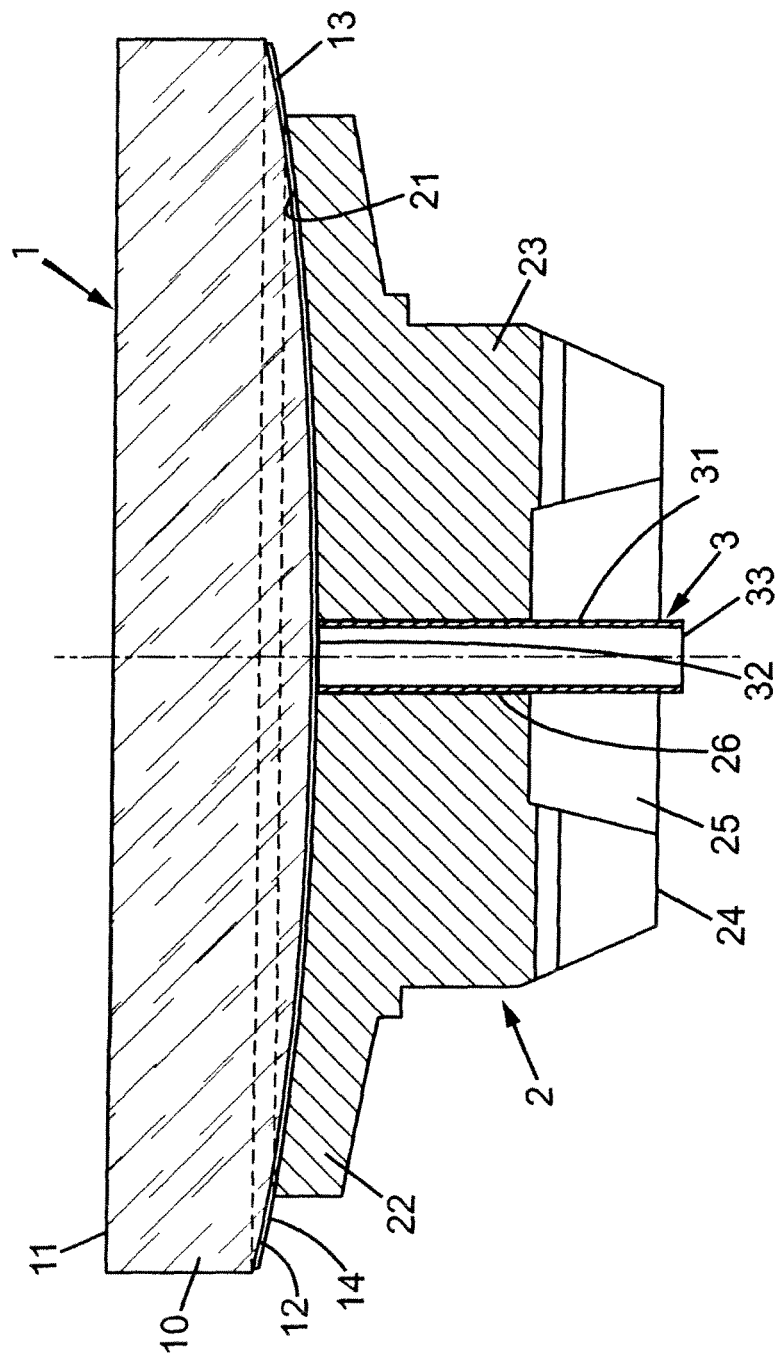

LENS BLOCKING AND DEBLOCKING METHOD AND RELATED DEVICE

RELATED APPLICATIONS

This is a U.S. national stage of application No. PCT/EP2008/055665, filed on May 7, 2008, and claims priority on European application No. 07290572.2, filed on May 7, 2007, the entire content of which is hereby incorporated by reference.

FIELD OF THE INVENTION

This invention relates to a lens blocking and deblocking method and device for use in adhering an ophthalmic lens to a lens block employed with conventional machining, grinding and processing equipment in the generation of ophthalmic lenses.

BACKGROUND OF THE INVENTION

The process of preparing optical or ophthalmic lenses begins with an unfinished or semi-finished glass or plastic lens blank. Typically a semi-finished lens blank has a finished polished front surface and an unfinished back surface. By grinding away material from the back surface of the lens blank the required corrective prescription is generated. Thereafter the surface having had the corrective prescription imparted thereto is polished and the peripheral edge of the thus processed lens blank is provided with a final desired contour thereby establishing a finished optical or ophthalmic lens. The lens blank can be either a plastic or a glass lens blank.

It is necessary during these various processing operations to securely maintain the lens blank in accurate alignment and in place on the lens block. This procedure is often referred to as "lens blocking".

Heretofore various materials were employed to secure the lens blank to the lens block. These materials include glues, pitch and low temperature fusible metal alloys. The use of glues and pitch, in addition to being messy, suffers the further disadvantage of generally being non-reusable or non-reclaimable. While the prior art use of low temperature metal alloys eliminated some of these disadvantages experienced with the use of glues and pitch, nonetheless, the use of these metal alloys, both in their preparation and their reclamation caused significant environmental and health hazards especially since these alloys were most often fabricated from such metals as cadmium, tin, lead and bismuth. Of these metals, lead and cadmium are the most toxic. Lead is strong protoplasmic poison and can be introduced into the body by ingestion, inhalation and skin absorption. Cadmium poisoning is similar to lead in many ways and is introduced into the body in the same way as lead. Like lead, cadmium is stored in the liver, kidney and bone. Procedures for the formulation of such alloys and reclamation processes so as to enable its re-use as a material to secure a lens blank to a lens block thus exposes workers to serious environmental and health hazards. The formation of these alloys often is accomplished through the use of powdered or particulate metals which are subjected to a sintering and heat treating process. Fumes and/or dust particles of these metals are released to the ambient atmosphere thereby creating environmental and health hazards for those formulating these alloys. The same hazards exist for those attempting to reclaim the used low temperature metal alloy blocking material.

To overcome these issues, organic low shrinkage materials have been developed to be used as lens blocking materials.

U.S. Pat. No. 6,036,313 in the name of 3M Innovative Properties Company discloses examples of compound families suitable for lens blocking with thermoplastic materials.

The disclosed blocking compositions have many advantages over traditional metal alloy materials. For example, the lens blocking compositions are non-toxic, environmentally safe, and preferably biodegradable. The materials preferably can be used with existing processing equipment and may be recycled. An ophthalmic lens block can be used that comprises a solidified mass of a thermoplastic blocking composition. The blocking composition may comprise a homopolymer or copolymer of epsilon-caprolactone, and preferably has a number average molecular weight of at least 3,000, a mean bending modulus of at least 69 MPa at 21° C., or a mean flexural strength of at least 1 MPa at 21° C. The composition is solid at 21° C. and has a sufficiently low melting or softening point such that the composition may be placed adjacent to an ophthalmic lens blank while at its melting or softening point without damaging the lens blank. The composition also has sufficient adhesion to a lens blank or to a lens blank coating or tape to hold an ophthalmic lens during a generating procedure.

Said document discloses also ophthalmic lens blocking kits that comprise the thermoplastic blocking composition and optionally a lens blank tape or coating and/or a preformed base block. For example the preformed base blocks comprise a front portion that has a negatively tapered peripheral edge. The preformed base block readily retains the thermoplastic blocking composition, yet can be separated from it after use. Lens blank tapes are conformable and comprise a polymer backing that has both polar and non-polar moieties. By adjusting the ratio of polar and non-polar moieties, the adhesion to a thermoplastic blocking composition can be adjusted.

This document discloses also a method of holding an ophthalmic lens blank, comprising the steps of:
  providing a lens blocking composition as described above;
  heating the lens blocking composition to its melting or softening point;
  providing a blocking material receiving cavity against the lens blank;
  forming the ophthalmic lens blocking composition into the receiving cavity; and allowing the composition to solidify.

Alternatively, a method of holding an ophthalmic lens blank is described, comprising the steps of:
  providing an ophthalmic lens block comprising a solidified mass of a thermoplastic blocking composition, and preferably comprising a heat absorbing material;
  heating the surface of the lens blocking composition to its melting or softening point;
  positioning a lens blank against the softened surface of the lens blocking composition; and allowing the composition to resolidify.

However the inventors have noticed that separating the thermoplastic blocking composition from the lens blank or from the lens blank tape or coating is an issue. This deblocking step comprises ordinarily a hammering step and a crack is generated at the interface between the thermoplastic blocking composition and the lens blank or the lens blank tape or coating.

Said step needs an operator, is often made after separating the ophthalmic lens block from the grinding machine, is time consuming and may introduce defects on the final lens.

WO 03/018253 discloses a lens block and associated deblocking apparatus and method where a pressurized fluid and/or a piston act as deblocking means. The deblocking is violent and a lens impact damper is provided to avoid lens damages.

Accordingly there remains a need for improving deblocking of a lens component, either a sole lens blank or a coated or tape covered lens blank, fixed on a thermoplastic block of an ophthalmic lens block.

SUMMARY OF THE INVENTION

One object of the present invention is to improve the deblocking step to enhance the quality of resulting lens.

This object is obtained according to one aspect of the invention directed to a method of deblocking a lens component fixed on a thermoplastic block of an ophthalmic lens block comprising the steps of:

a) applying a pushing strain on the surface of the lens component fixed on the thermoplastic block, b) providing a warm gas flow at the interface between the lens component and the thermoplastic block, wherein the pushing strain is maintained during providing the warm gas flow at the interface between the lens component and the thermoplastic block, wherein the stress applied to obtain the pushing strain of step a) is greater or equal to 0.1 MPa and/or less or equal to 1 MPa and wherein the temperature of the warm gas flow of step b) is greater or equal to 30° and/or less or equal to 70° C.

According to the present invention, a "thermoplastic block" is a block of material which comprises at least a thermoplastic material. A thermoplastic material can be remelted or soften when being heated and remolded when cooling after melting or softening. Most thermoplastics are high molecular weight polymers whose chains associate through weak van der Waals forces (polyethylene); stronger dipole-dipole interactions and hydrogen bonding (nylon); or even stacking of aromatic rings (polystyrene). Many thermoplastic materials are addition polymers; e.g., vinyl chain-growth polymers such as polyethylene and polypropylene. The thermoplastic inorganic material may comprise additives (such as, for example, plasticizers, stabilizers, pigments, . . . ) and/or fillers (such as mineral and/or organic fillers, as for examples boron, carbon, clay, glass, cellulose, metals, oxides, aramide, polyamide, . . . ; fillers may be of different geometry, such as for example grains, lamella, short or long fibers, . . . ).

Thanks to the selected parameters, the deblocking is soft and no lens impact damper has to be provided. The decohesion at the interface between the bottom surface of the lens component and the upper surface of the thermoplastic block is progressive and the quality of the final lens is fully preserved.

According to further embodiments which can be considered alone or in combination, the lens component is a sole lens blank, or the lens component is a lens blank and a coating or tape applied to the lens blank surface close to the thermoplastic block, the lens blank can be either a plastic or a glass lens blank, the pushing strain of step a) is obtained by moving a tube through the thermoplastic block to contact the surface of the lens component fixed on the thermoplastic block and further moving the tube to push the lens component, the relative humidity of the warm gas flow of step b) is greater or equal to 75% and less or equal to 100%, water droplets are pulverized into the warm gas flow, the pressure of the warm gas flow of step b) is greater or equal to 0.5 bar and/or less or equal to 6 bars, as for an example greater or equal to 2.5 bar and/or less or equal to 3 bar, the gas of the warm gas flow of step b) is air, the tube is a hollow tube also used to provide the warm gas flow at the interface between the lens component and the thermoplastic block, the tube is placed in the centre of the thermoplastic block.

Another aspect of the invention relates to a method of grinding and/or polishing and/or edging a lens component comprising the steps of:

providing a thermoplastic block, heating the thermoplastic block to a temperature at which at least a part of it will flow under moderate pressure, placing the lens onto said part of the thermoplastic block, allowing the thermoplastic block flown part to solidify, thereby adhering the lens component, machining such as grinding and/or polishing and/or edging the lens component, deblocking the lens component as previously mentioned.

Another aspect of the invention relates to an ophthalmic lens block comprising a thermoplastic block used to allow a lens component to adhere on it wherein the thermoplastic block is provided with a hole in which a moving hollow tube is placed and the hole is a central hole.

According to further embodiments of the ophthalmic lens block, the ophthalmic lens block and the thermoplastic block are a sole part made of a thermoplastic material.

BRIEF DESCRIPTION OF THE ONLY DRAWING

Non limiting embodiments of the invention will now be described with reference to the accompanying drawing wherein FIG. 1 is a cross sectional view of a lens component fixed on an ophthalmic lens block according to the present invention.

DETAILED DESCRIPTION OF THE ONLY DRAWING

Skilled artisans appreciate that elements in the FIGURE are illustrated for simplicity and clarity and have not necessarily been drawn to scale. For example, the dimensions of some of the elements in the FIGURE may be exaggerated relative to other elements to help improve the understanding of the embodiments of the present invention.

The wording "upper" and "bottom" indicates positions relative to the ophthalmic lens block when it is arranged so as the lens blank surface to be machined is substantially situated in a horizontal plane.

The lens component 1 comprises a lens blank 10 with an upper surface 11 to be machined and a bottom surface 12 on which a protecting tape 13 has been fixed. The upper surface 11 can be a plane or a concave or convex surface.

The thermoplastic block 2 is the ophthalmic lens block which can be inserted in the chuck or fixing part of a holding tool (not drawn). Said holding tool may be part of a lathe or other movement inducing machine.

The thermoplastic block 2 comprises a bottom surface 24 and a hole 25 for positioning it in the chuck or fixing part, a central cylindrical part 23 to be squeezed by the chuck or fixing tool and an upper part 22 with an upper surface 21 on which is placed the bottom surface 14 of the lens component 1 to be machined.

The thermoplastic block 2 comprises a cylindrical hole 26 emerging on the upper surface 21 and going through the thermoplastic block 2.

It has to be noticed that the thermoplastic block 2 of FIG. 1 is the ophthalmic lens block, but the invention is not limited to such an arrangement and the thermoplastic block can be part of a conventional ophthalmic lens block which includes a cavity where the lens blocking material is placed, and frequently injected after disposing the lens component 10. This cavity may be used to place a thermoplastic block according to the present invention.

A tube 3 is inserted in the hole 26 of the thermoplastic block 2, and preferably slightly squeezed in the thermoplastic block to prevent fluid to flow between the tube 3 and the thermoplastic block 2. The tube 3 is movable inside the thermoplastic 2 so as to let its upper surface 32 contact the bottom surface 14 of the lens component 1.

The tube 3 has a bottom surface 33 which can be connected to a gas inlet (not drawn) and a thin tube wall 31.

The tube 3 has a circular section, but other tube sections are also suitable, such as elliptic or square sections.

As for an example the height of the thermoplastic block 2 is 25 mm, its external diameter in upper part 22 is 70 mm, its external diameter in the central cylindrical part 23 is 43 mm, the diameter of the hole 26 is 5 mm, and the internal diameter of tube 3 is 3.8 mm.

As for an example the external diameter of the lens component 1 is 80 mm.

The thermoplastic of the thermoplastic block 2 melts or softens at a low temperature, less than the temperature at which the material(s) of the lens component may degrades or flows. Preferably the melting or softening point of the thermoplastic blocking composition is between 45° C. and 75° C. Suitable thermoplastic blocking composition may be selected from the group consisting of polyesters, polyurethanes, ionomer resins of ethylene copolymers, polyester-polysiloxane block copolymers, segmented co polyesters and polyetheresters, ethylene vinyl acetate resins and copolymers, waxes, polycaprolactones, and blends thereof.

Said composition may comprise a homopolymer or copolymer of epsilon-caprolactone.

Examples of thermoplastic blocking composition are given in previously cited U.S. Pat. No. 6,036,313 and are suitable for the present invention.

The lens blank 10 of the lens component 1 is a plastic or a glass lens blank.

The protecting tape 13 fixed on the bottom surface 12 of the lens blank 10 has preferably a pressure-sensitive adhesive surface and a tack-free adhesion promoting surface. The tape 13 assists in the firm bonding of the lens blank 1 to the thermoplastic block 2.

Preferred tapes are conformable, that is, they follow the curvature of the lens blanks without any wrinkles or air bubbles; and translucent, that is, they permit light to pass there through. As a result, the lens may be visually aligned in the appropriate device prior to blocking. Still further, when preferred tapes are removed from the lens, they leave virtually no adhesive residue. Thus, messy and time consuming cleaning operations need not be performed on the lens before it can be used.

Despite this clean removability, suitable tapes may exhibit excellent adhesion to both the lens blank and the thermoplastic blocking composition. Additionally, the tapes may be able to withstand the shear forces encountered during the surfacing and edging operations. As a result, lenses are held in accurate position throughout these operations. An added benefit offered by using a tape is the protection provided to the lenses from thermal and mechanical shock.

The composition of the exposed surface of the tape (i.e., the non-adhesive surface away from the lens blank) may be selected so as to achieve the desired degree of adhesion with the particular thermoplastic blocking composition.

Examples of suitable tapes are given in previously cited U.S. Pat. No. 6,036,313.

As for examples, tapes commercialized by the company 3M and referred as 1640 and 1641 are particularly suitable.

According to an embodiment of the present invention, the upper surface 21 of the thermoplastic block 2 is heated, for example with UV or IR lamps, so as to let a thin blocking material zone melt or soften. The lens component 1 is then placed onto said molten or softened zone and moderate pressure is applied onto the lens component. The lens component is securely blocked after the cooling of the blocking material and the lens blank is machined using conventional tools to provide grinding and/or polishing and/or edging.

After machining the lens blank, the lens component is deblocked and detached from the blocking material.

The tube 32 is moved within the thermoplastic block hole 26 and contacts the bottom surface 14 of the lens component 1.

The upper surface 32 of the tube 3 press onto the lens component bottom surface 14 so as to apply a stress between 0.1 and 1 MPa. A slight de-cohesion appears at the interface between the bottom surface 14 of the lens component 1 and the upper surface 21 of the thermoplastic block 2.

Warm air is introduced within the tube 3 with a pressure between 0.5 and 6 bars. The upper surface 32 of the tube 3 continue to press onto the lens component bottom surface 14 so as to apply a stress between 0.1 and 1 MPa.

The warm air may have a humidity of at least 75%, a temperature between 30° C. and 70° C.

The aperture of upper surface 32 of tube 3 acts as a nozzle and let the warm air flow laminate.

The warm laminated air flow propagates along the interface between the bottom surface 14 of the lens component 1 and the upper surface 21 of the thermoplastic block 2.

The de-cohesion propagates rapidly along the interface between the bottom surface 14 of the lens component 1 and the upper surface 21 of the thermoplastic block 2; the lens component 1 can then be very easily deblocked without any damage.

According to this embodiment, the pushing strain is vertical and the gas flow propagates substantially horizontally.

The tape 13 is removed from the lens blank 10 after deblocking the lens component 1.

The thermoplastic block 2 can be rapidly reused to machine another lens blank.

The inventors have noticed that using this deblocking method make possible to avoid hammering and preserve the lens blank quality.

Surprisingly the inventors have noticed that combining a moderate pushing strain on the surface of the lens component and a warm gas flow at the interface between the lens component and the thermoplastic allow deblocking the lens component rapidly and with low strain level.

Different trials have been done and the inventors have observed that the pushing strain on the surface of the lens component can be decreased when the relative humidity and/or temperature of the warm gas is increased.

Introducing atomized water into the warm gas flow has been identified as a particularly efficient solution.

According to an embodiment, the temperature corresponding to the beginning of the fusion (onset temperature) of the thermoplastic material of the thermoplastic block is between 45 and 50° C., as for example about 48° C., its peak temperature is between 53 and 58° C. as for example about 56° C., its temperature corresponding to the end of the fusion (end temperature) is between 55 and 60° C., as for example about 59° C.

According to an embodiment of the present invention, the temperature of the warm gas flow of step b) is equal or greater than the temperature corresponding to the beginning of the fusion (onset temperature) of the thermoplastic material of the thermoplastic block.

According to an embodiment of the present invention, the temperature of the warm gas flow of step b) is equal or less than the temperature corresponding to the end of the fusion (end temperature) of the thermoplastic material of the thermoplastic block.

According to an embodiment of the present invention the temperature of the warm gas flow is equal or greater than the melting or softening point of the thermoplastic material of the thermoplastic block.

The invention has been described above with the aid of embodiments without limitation of the general inventive concept which is evident from the claims and the general portion of the specification.

The invention claimed is:

1. A method of deblocking a lens component fixed on a thermoplastic block of an ophthalmic lens block comprising the steps of:
   (a) applying a pushing strain on the surface of the lens component fixed on the thermoplastic block;
   (b) providing a warm gas flow at the interface between the lens component and the thermoplastic block; and
   maintaining the pushing strain during the step of providing the warm gas flow at the interface between the lens component and the thermoplastic block, wherein the stress applied to obtain the pushing strain of step (a) is greater than or equal to 0.1 MPa and less than or equal to 1 MPa and wherein the temperature of the warm gas flow of step (b) is greater than or equal to 30° C. and less than or equal to 70° C.;
   wherein the pushing strain is perpendicular to the interface and the warm gas flow propagates parallel to the interface.

2. The method according to claim 1, wherein the lens component is a sole lens blank or the lens component is a lens blank and a coating or tape applied to the lens blank surface close to the thermoplastic block.

3. The method according to claim 1, wherein the pushing strain of step (a) is obtained by moving a tube through the thermoplastic block to contact the surface of the lens component fixed on the thermoplastic block and further moving the tube to push the lens component.

4. The method according to claim 1, wherein the relative humidity of the warm gas flow of step (b) is greater or equal to 75% and less or equal to 100%.

5. The method according to claim 1, wherein water droplets are pulverized into the warm gas flow.

6. The method according to claim 1, wherein the pressure of the warm gas flow of step (b) is greater than or equal to 0.5 bar and less than or equal to 6 bars.

7. The method according to claim 1, wherein the gas of the warm gas flow of step (b) is air.

8. The method according to claim 3, wherein the tube is a hollow tube also used to provide the warm gas flow at the interface between the lens component and the thermoplastic block.

9. The method according to claim 8, wherein the tube is placed in the center of the thermoplastic block.

10. The method according to claim 1, wherein the melting or softening point of the thermoplastic of the thermoplastic block is between 45° C. and 75° C.

11. A method of grinding and/or polishing and/or edging a lens component comprising the steps of:
    providing a thermoplastic block;
    heating the thermoplastic block to a temperature at which at least a part of it will flow under moderate pressure;
    placing the lens onto said part of the thermoplastic block;
    allowing the thermoplastic block flowed part to solidify, thereby adhering the lens component;
    machining the lens component; and
    deblocking the lens component according to the method of claim 1.

12. The method according to claim 3, wherein the tube is placed in the center of the thermoplastic block.

13. The method according to claim 1, wherein the pressure of the warm gas flow of step (b) is greater than or equal to 2.5 bar and less than or equal to 3 bar.

* * * * *